Patented Jan. 22, 1935

1,988,483

UNITED STATES PATENT OFFICE 1,988,483

COLORED RUBBER PRODUCT AND METHOD OF MAKING SAME

Elmer G. Croakman, Akron, Ohio, assignor to National Aniline & Chemical Company, Inc., New York, N. Y., a corporation of New York No Drawing. Application November 10, 1927, Serial No. 232,460

9 Claims. (Cl. 18—50)

This invention relates to the production of colored rubber and rubber products, both unvulcanized and vulcanized. It relates more particularly to the process of coloring raw rubber material such as rubber latex, dispersed rubber, balata, gutta-percha, etc., and to the products resulting therefrom both before and after vulcanization.

Rubber latex is obtained from certain plants and consists of a colloidal suspension, emulsion or solution of rubber and water, the exact physical and chemical nature of which is unknown, but which is generally regarded as being a modified suspension. This suspension is generally preserved against putrefaction and coagulation by the addition thereto of an anti-coagulant such as ammonia, etc. until such time as it is ready for coagulation treatment. In the coagulation treatment the rubber is isolated from the solution or dispersion by treating it with an acid to precipitate its rubber content, or by subjecting it to the action of an electric current to deposit the rubber by electrolysis, in which case an aqueous portion remains, or the solution or dispersion may be evaporated to dryness in an evaporator, or by spray drying. The rubber produced is washed, milled, etc., and vulcanized in the manner known to the art.

In the art of coloring rubber latex for the production of colored rubber and rubber products therefrom, the use of organic dyes presents difficulties. Oil soluble organic dyestuffs cannot ordinarily be used to advantage since they are insoluble in the rubber latex. On the other hand, many water soluble dyes are either precipitated or destroyed by the rubber latex solution when added thereto, and still other dyes are not taken up and dissolved by the rubber which separates out when the latex is coagulated by the addition of acid or by other means, but are left behind in the aqueous portion.

It is well known that under suitable conditions certain organic dyes can be used for coloring or dyeing raw rubber material and rubber compounds or compositions. As heretofore practiced, however, the organic dyes thus employed have been incorporated or compounded in their normal state of oxidation with the raw rubber material, or the unvulcanized rubber mix, and the resulting colored product subsequently used or treated in any desired way known to the art. Unvulcanized colored rubber products thus obtained have been ordinarily subjected to vulcanization at a suitable temperature in the presence of vulcanizing ingredients and a suitable accelerator.

According to the present invention, improved results can be obtained in the coloring of raw rubber material such as rubber latex, rubber emulsions, rubber dispersions, synthetic aqueous rubber emulsions, rubber solutions, etc., by mixing with the same the leuco compound or a solution of the leuco compound of a dye, and oxidizing the leuco compound to the dye to form a colored product. Thus, in the coloring of rubber latex, the latex is mixed with an aqueous solution of the leuco compound of a dye, and the rubber, admixed with the leuco compound, is coagulated by treating the dispersed mixture with an acid, or by electrolysis or by spray drying, or by other suitable means. Either before or during the isolation of the rubber from the latex solution, or afterwards, the leuco compound of the dye is contacted with an oxidant such as air in order to oxidize the leuco compound of the dye to the normal state of oxidation to produce the rubber as a colored product. The rubber thus obtained is colored shades which in general are fast to washing and do not "bleed". It may be compounded in the usual way with other ingredients, and may be vulcanized by any suitable method, generally giving uniformly colored products which are fast to washing and do not "bleed".

It has been found that dyestuffs in the leuco state or solutions thereof readily disseminate and distribute throughout an unvulcanized rubber substance, and upon exposure to air or other oxidants, either before, during or after vulcanization, give colored products. In coloring rubber substances, such as gutta percha, balata, caoutchouc, coagulated latex, crepe and the like, improved results can be obtained by incorporating or compounding therewith in the unvulcanized state, and with or without the addition of a substratum, and/or a vulcanizing ingredient, and/or a vulcanization accelerator, an organic dye in the reduced or leuco state and oxidizing the dyestuff before, during, or after vulcanization. The resulting colored products are generally fast to light and do not bleed. Further, the treated unvulcanized products in general undergo vulcanization at vulcanization temperatures with little, if any, injury to the dyestuff or the rubber. In some instances, however, the colored vulcanized rubber is not of the same shade or tint as the unvulcanized product.

The following examples will further illustrate the invention, but it will be understood that the invention is not limited thereto. The parts are by weight.

*Example 1.*—To 400 parts of an ammoniacal rubber latex solution there is added one part of hydron blue R (Schultz No. 748) previously dissolved in 40 parts of a 3 to 4 percent alkaline sodium hydrosulfite solution. The mixture thus produced, which is of greenish to bluish yellow color, is then made acid by the addition of excess acetic acid, and the coagulated and precipitated rubber removed from the solution. The isolated rubber is then dried in contact with air whereupon the resultant rubber is colored a blue shade. 100 parts of the colored rubber thus obtained, mixed with 10 parts zinc oxide, 3.5 parts sulfur, and 0.75 parts of diphenylguanidine, and cured for 60 minutes at a temperature of 40 lbs. steam pressure (about 140°–141° C.) gives a vulcanized rubber having a deep blue shade.

*Example 2.*—To 100 parts of an aqueous rubber latex solution or dispersion there is added 1 part of sulfur Bordeaux (Schultz No. 739, prepared by treating 2-amino-3-methyl-2'-hydroxyphenazine with sodium polysulfide) previously dissolved in 15 parts of a 10 percent sodium sulfide aqueous solution. The latex solution is colored a Bordeaux shade. A balloon form is dipped into the solution, the aqueous contents of the solution on the form is allowed to evaporate in the air. This process is repeated several times until a coating of colored rubber of sufficient thickness is obtained on the form. It is then vulcanized in the usual way by means of sulfur chloride whereby the balloon is obtained as a vulcanized product having a reddish-brown shade.

*Example 3.*—To a rubber mix consisting of

|  | Parts |
|---|---|
| Pale crepe | 100 |
| Zinc oxide | 15 |
| Sulfur | 4 |
| Diphenylguanidine | ½ | on a warm mixing mill there is slowly added a solution comprising one-quarter part of thional green 2G (Schultz No. 746, prepared from 1-phenylamino-4'-hydroxyphenylaminonaphthalene-8'-sulfonic acid and sodium polysulfide; cf. U. S. P. 776,885) in 5 parts of a 15 percent sodium sulfide aqueous solution and 10 parts of Turkey red oil. The unvulcanized mixture upon exposure to air is colored a light green shade. Upon being cured in a mold for 75 minutes at a temperature corresponding to 40 lbs. steam pressure (about 140°–141° C.), a vulcanized rubber product having a similar light green shade is produced.

In a similar manner leuco compounds of the anthraquinone vat and the indigoid vat series, and of the sulfur dyestuffs, may be used. The anthraquinone and indigoid vat dyes upon solution or treatment with alkaline hydrosulfite solution are reduced to the leuco state, while the sulfur dyes are reduced to the leuco state by treatment or solution in sodium sulfide or in sodium hydrosulfite solutions.

In place of the leuco compounds used in the above examples, the leuco compounds of other dyes, such as, for example, the leuco derivatives of thional green 2G (Schultz No. 746), indanthrene blue R (Schultz No. 837), immedial indone (Schultz No. 733), indanthrene green B (Schultz No. 765), indanthrene violet 2R (Schultz No. 767), indanthrene dark blue BO (Schultz No. 763) may be used. A mixture of two or more leuco compounds of the above dyes or of two or more leuco compounds of dyes of the same or different series may be used in the above examples, and by using the proper proportions, the desired shade or color can be produced in the finished product.

In the removal of the dispersing liquid from the rubber material in dispersed condition, various methods may be used. Thus where the leuco compound of the dye has been incorporated with the latex or similar material under conditions preventing oxidation, such as in the presence of an excess of the reducing agent, the vehicle may be removed by spray drying in an atmosphere of nitrogen, carbon dioxide, combustion gases, or other inert gases (in which case a coagulated rubber is obtained in which the dye stuff is still in the leuco form), and the rubber product thus obtained may be then subjected to oxidation; or the latex or similar material may be coagulated by standing in contact with air, or evaporated or sprayed into an atmosphere of an oxidant such as air, in which case the leuco compound of the dye will be oxidized at the same time that the rubber material is being coagulated.

When the rubber is to be vulcanized by means of sulfur, the sulfur, and, if used, the filler, and/or vulcanization accelerator may be added to the latex, rubber emulsion or dispersion, containing the leuco compound of the dye, before coagulation, or to the rubber after coagulation, or to both.

If desired, the complete series of steps of addition of leuco compound of the dye, coagulation and vulcanization may be carried out under conditions preventing oxidation of the leuco compound, and the vulcanized product may then be subjected to oxidation.

When instead of latex, a rubber or similar aqueous emulsion, suspension or dispersion is treated with a leuco compound of a dye, it may also be coagulated by various methods such as spraying, evaporating, electro-depositing, and the like.

If a fabric coated or impregnated with colored rubber is desired, the fabric may be impregnated or coated with the latex or similar material containing the dyestuff in the leuco state and the leuco compound simultaneously oxidized, or the oxidation may be performed after the coating or impregnation.

It will be further understood that the latex can be mixed with the leuco compound of the dye in various proportions, or with the leuco compounds of a mixture of dyes, and with or without the addition of other ingredients employed in the manufacture of unvulcanized or of vulcanized rubber products; that the rubber contents of the colored latex may be isolated in any suitable manner; and that the oxidation of the leuco compound in admixture with the latex or with the isolated rubber may be carried out at any suitable time in any suitable way.

It is to be understood that the invention is not limited to the treatment of rubber latex but that synthetic aqueous rubber emulsions, rubber solutions or suspensions, artificial latex, suspensions or solutions of substances similar to rubber, as well as gutta-percha, balata, coagulated latex, caoutchouc, flocculated rubber or crepe rubber may be treated as above described.

Where in the specification and claims the expression "raw rubber material" is used, it is intended to include not only liquid rubber compounds such as rubber latex, synthetic aqueous rubber emulsions, dispersed rubber, "artificial latex", and the like, but also solid substances which exhibit the characteristic properties of rubber before vulcanization, such as balata, gutta-percha, coagulated latex, caoutchouc, flocculated rubber, and the like; where the expression "rubber material in dispersed condition" is used, it is intended to include various natural rubber latexes, dispersed rubber, rubber solutions, synthetic or "artificial" aqueous rubber emulsions, so-called "artificial latex" and the like; where the expression "rubber material" is used, it is intended as a generic expression to denote the above solid substances either before or after vulcanization; and where the expression "a rubber latex" is used, it is intended to include "artificial latex" as well as the natural product.

It is further understood that the term "coagulating" is used not only in a narrow sense as applied to latex but also in its broad meaning with relation to such materials as dispersed rubber, rubber solutions and synthetic aqueous rubber emulsions so as to include the removal of the vehicle from the solution or emulsion leaving the aggregated rubber material.

I claim:

1. In a process of producing a colored rubber product, the steps which comprise incorporating the leuco compound of a dye other than indigo with a rubber latex, coagulating the latex, oxidizing the leuco compound, and vulcanizing the rubber.

2. In the process of coloring a rubber material, the improvement which comprises incorporating with a raw rubber material the leuco compound of a dye other than indigo which is not destroyed in the hot vulcanization of rubber, oxidizing the leuco compound contained in the resulting mixture to develop the color, and subjecting the resulting colored rubber material to a hot vulcanization process.

3. In a process of coloring rubber, the steps which comprise incorporating the leuco compound of a dye with rubber latex, adding a vulcanizing agent, coagulating the rubber material, vulcanizing the mixture, all the steps being carried out under conditions preventing oxidation of the leuco compound, and then submitting the vulcanized rubber to oxidation, whereby a colored rubber product is obtained.

4. In a process of producing a colored rubber product the improvement which comprises adding a leuco compound of a vat dye other than indigo to an ammoniacal rubber latex, coagulating the rubber by means of an acid, drying the resultant rubber, and oxidizing the leuco compound, and then vulcanizing.

5. In a process of producing a colored rubber product the improvement which comprises adding a leuco compound of an anthraquinone vat dye to an ammoniacal rubber latex solution, coagulating the rubber with acetic acid, removing the coagulated rubber from solution, drying the rubber, and oxidizing the leuco compound by contact with air, admixing the colored rubber thus obtained with vulcanizing ingredients, and then vulcanizing.

6. In the process of coloring a rubber material, the improvement which comprises incorporating with a raw rubber material a leuco compound of an anthraquinone vat dye, oxidizing the leuco compound to develop the color, and vulcanizing the rubber material.

7. In the process of coloring a rubber material, the improvement which comprises incorporating with a raw rubber material a leuco compound of a sulphur dye, oxidizing the leuco compound to develop the color, and vulcanizing the rubber material.

8. In a process of producing a colored rubber product, the steps which comprise incorporating a leuco compound of an anthraquinone vat dye with a rubber material in dispersed form, oxidizing the leuco compound, coagulating the rubber material, and vulcanizing the rubber material.

9. In a process of producing a colored rubber product, the steps which comprise incorporating a leuco compound of a sulphur dye with a rubber material in dispersed form, oxidizing the leuco compound, coagulating the rubber material, and vulcanizing the rubber material.

ELMER G. CROAKMAN.